(12) United States Patent
Uematsu et al.

(10) Patent No.: US 10,483,823 B2
(45) Date of Patent: Nov. 19, 2019

(54) ELECTRIC ACTUATOR

(71) Applicant: Nidec Tosok Corporation, Zama-shi, Kanagawa (JP)

(72) Inventors: Yutaka Uematsu, Zama (JP); Kazumi Shinkai, Zama (JP); Shuichi Kinjo, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 58 days.

(21) Appl. No.: 15/936,528

(22) Filed: Mar. 27, 2018

(65) Prior Publication Data

US 2018/0287455 A1  Oct. 4, 2018

(30) Foreign Application Priority Data

Mar. 30, 2017  (JP) .................. 2017-067262

(51) Int. Cl.
| | |
|---|---|
| H02K 7/116 | (2006.01) |
| H02K 5/22 | (2006.01) |
| H02K 11/215 | (2016.01) |
| H02K 11/33 | (2016.01) |
| F16H 57/02 | (2012.01) |
| F16H 1/32 | (2006.01) |
| H02K 11/38 | (2016.01) |

(52) U.S. Cl.
CPC .............. *H02K 5/225* (2013.01); *F16H 1/32* (2013.01); *F16H 57/02* (2013.01); *H02K 7/116* (2013.01); *H02K 11/215* (2016.01); *H02K 11/33* (2016.01); *H02K 11/38* (2016.01); *F16H 2001/325* (2013.01); *F16H 2057/02034* (2013.01); *H02K 2211/03* (2013.01)

(58) Field of Classification Search
CPC ........ H02K 5/22; H02K 11/215; H02K 7/116; H02K 11/38; H02K 5/225; H02K 11/33; H02K 2211/03; F16H 1/32; F16H 57/02; F16H 2001/325; F16H 2057/02034
See application file for complete search history.

(56) References Cited

U.S. PATENT DOCUMENTS

| | | | |
|---|---|---|---|
| 6,701,803 B1 * | 3/2004 | Tamai ................... | F16H 49/001 74/640 |
| 2009/0058208 A1 * | 3/2009 | Kimura ................ | H02K 5/1732 310/83 |

FOREIGN PATENT DOCUMENTS

| | | |
|---|---|---|
| JP | 2001-112215 A | 4/2001 |
| JP | 2003-285665 A | 10/2003 |
| JP | 2009-065742 A | 3/2009 |

* cited by examiner

*Primary Examiner* — Naishadh N Desai
(74) *Attorney, Agent, or Firm* — Keating & Bennett, LLP

(57) ABSTRACT

An electric actuator includes a motor, a speed reduction mechanism, a case, an output portion, a first board, a rotation detection device that detects rotation of the output portion, a connector portion, a first wiring member electrically connected to electrical wiring via the connector portion, and a second wiring member electrically connected to the rotation detection device. The case includes a first case and a second case. The first board is accommodated in the first case. The rotation detection device is accommodated in the second case. The first wiring member includes a first connecting portion held in the first case. The second wiring member includes a second connecting portion held in the second case. The first connecting portion is exposed on one side in the axial direction of the first case. The second connecting portion is exposed on the other side in the axial direction of the second case.

14 Claims, 6 Drawing Sheets

ELECTRIC ACTUATOR

CROSS REFERENCE TO RELATED APPLICATIONS

This application claims the benefit of priority to Japanese Patent Application No. 2017-067262 filed on Mar. 30, 2017. The entire contents of this application are hereby incorporated herein by reference.

BACKGROUND OF THE INVENTION

1. Field of the Invention

The present invention relates to an electric actuator.

2. Description of the Related Art

An actuator including an electric motor and a speed reducer is known.

For example, an actuator described in Japanese Unexamined Patent Application Publication No. 2001-112215 includes a rotational position detector that detects a rotational position of a rotating shaft of an electric motor.

In the actuator described above, for example, in a case where a trouble occurs in the rotational power transmission between the electric motor and the speed reducer via a gear, there is a problem that detection accuracy of the rotational position of the output shaft of the speed reducer decreases even when the rotational position of the rotating shaft of the electric motor is detected. Therefore, there is a case that a trouble occurs in a driving force control of the actuator.

On the other hand, for example, it is conceivable to separately provide a detector that detects a rotational position of an output shaft of a speed reducer. In this case, for example, in order to obtain power of the detector from power of an electric motor, a wiring member of the detector may be routed to an electric motor side. However, since the detector detects the rotational position of the output shaft of the speed reducer, the detector is likely to be disposed away from the electric motor. As a result, routing of the wiring member for supplying power to the detector is likely to be complicated, and labor for disposing the wiring member may be increased in some cases. Therefore, there is a problem that the labor for assembling the actuator increases and a manufacturing cost of the actuator increases.

The present invention is made in consideration of the circumstance and an object thereof is to provide an electric actuator including a rotation detection device that detects rotation of an output portion to which rotation of a motor shaft is transmitted via a speed reduction mechanism and having a structure capable of reducing labor of assembly and manufacturing cost.

SUMMARY OF THE INVENTION

According to an aspect of the present invention, there is provided an electric actuator including a motor that has a motor shaft extending in an axial direction, a speed reduction mechanism disposed on an outer side in a radial direction of a portion on one side of the motor shaft in the axial direction and connected to the motor shaft, a case that accommodates the motor and the speed reduction mechanism, an output portion to which rotation of the motor shaft is transmitted via the speed reduction mechanism, a first board electrically connected to the motor, a rotation detection device that detects rotation of the output portion, a connector portion provided in the case and connected to electrical wiring outside the case, a first wiring member electrically connected at least indirectly to the electrical wiring via the connector portion, and a second wiring member electrically connected to the rotation detection device, in which the case includes a first case provided with the connector portion and including a first opening portion which opens on one side in the axial direction, and a second case including a second opening portion which opens on the other side in the axial direction, the first board is accommodated in the first case, the rotation detection device is accommodated in the second case, an end portion on one side in the axial direction of the first case and an end portion on the other side in the axial direction of the second case are fixed to each other in a state where the first opening portion and the second opening portion are opposed to each other in the axial direction, the first wiring member includes a first connecting portion held in the first case, the second wiring member includes a second connecting portion held in the second case, the first connecting portion is exposed on one side of the first case in the axial direction, the second connecting portion is exposed on the other side of the second case in the axial direction, and the first connecting portion and the second connecting portion are disposed at positions overlapping in the axial direction in a state where the first case and the second case are fixed to each other, and are electrically connected to each other.

The above and other elements, features, steps, characteristics and advantages of the present invention will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Figure 1:
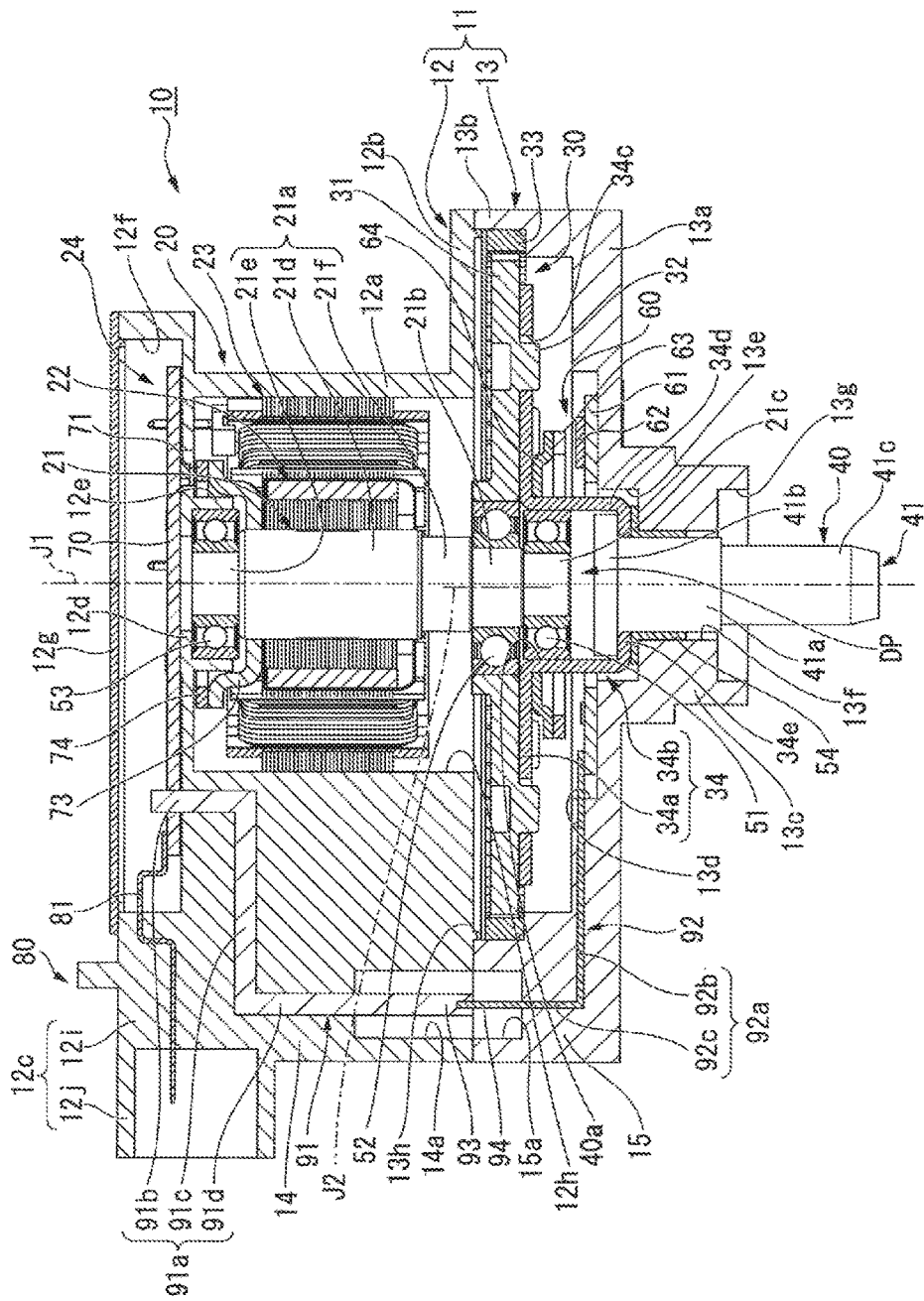
FIG. 1 is a view illustrating an electric actuator of the present embodiment, and is a cross-sectional view taken along line I-I in FIG. 2.

As illustrated in FIG. 1, an electric actuator 10 of the present embodiment is provided with a case 11, a motor 20 having a motor shaft 21 extending in the axial direction of a first central axis J1, a control portion 24, a connector portion 80, a speed reduction mechanism 30, an output portion 40, a rotation detection device 60, a first wiring member 91, a second wiring member 92, a first bearing 51, a second bearing 52, a third bearing 53, and a bush 54. The first bearing 51, the second bearing 52, and the third bearing 53 are, for example, ball bearings. An axial direction of the first central axis J1 is parallel to a vertical direction.

In the following description, the axial direction of the first central axis J1 is simply referred to as "axial direction", an upper side of FIG. 1 in the axial direction is simply referred to as "upper side", and a lower side of FIG. 1 in the axial direction is simply referred to as "lower Side". In addition, a radial direction around the first central axis J1 is simply referred to as "radial direction", and a circumferential direction with the first central axis J1 as a center is simply referred to as "circumferential direction". The upper side and the lower side are simply a name for explaining a relative positional relationship between the respective portions, and an actual arrangement relationship or the like may be an arrangement relationship or the like other than the arrangement relationship indicated by these names or the like. The upper side corresponds to the other side in the axial direction, and the lower side corresponds to one side in the axial direction.

The case 11 accommodates the motor 20 and the speed reduction mechanism 30. The case 11 includes a motor case 12 that accommodates the motor 20 and a speed reduction mechanism case 13 that accommodates the speed reduction mechanism 30. The motor case 12 corresponds to a first case. The speed reduction mechanism case 13 corresponds to a second case. The motor case 12 includes a case tubular portion 12a, an upper lid portion 12g, a case flange portion 12b, and an annular plate portion 12d, a bearing holding portion 12e, a control board accommodating portion 12f, a terminal holding portion 12c, and a first wiring holding portion 14.

The case tubular portion 12a has a cylindrical shape extending in the axial direction with the first central axis J1 as a center. The case tubular portion 12a includes a first opening portion 12h that opens downward. That is, the motor case 12 includes the first opening portion 12h. The case tubular portion 12a surrounds an outer side in the radial direction of the motor 20. The annular plate portion 12d has an annular plate shape extending radially inward from an inner peripheral surface of an upper end portion of the case tubular portion 12a. The annular plate portion 12d covers an upper side of a stator 23 described later of the motor 20. The bearing holding portion 12e has a cylindrical shape protruding downward from the lower surface of the annular plate portion 12d. The bearing holding portion 12e opens downward with the first central axis J1 as a center. The third bearing 53 is fixed and held on the inner peripheral surface of the bearing holding portion 12e.

The case flange portion 12b has an annular plate shape extending radially outward from a lower end portion of the case tubular portion 12a. The control board accommodating portion 12f is a portion that accommodates a control board 70 described later. The control board accommodating portion 12f is located above the case tubular portion 12a. A portion of a bottom surface of the control board accommodating portion 12f is the upper surface of the annular plate portion 12d. The control board accommodating portion 12f opens upward. The upper lid portion 12g is a plate-like lid that closes the upper end opening of the control board accommodating portion 12f.

The terminal holding portion 12c protrudes radially outward from the case tubular portion 12a. More specifically, the terminal holding portion 12c extends radially outward from an outer peripheral surface at the upper end portion of the case tubular portion 12a. The terminal holding portion 12c includes a base portion 12i protruding radially outward from the case tubular portion 12a and a tip end portion 12j connected to an outer end portion in the radial direction of the base portion 12i. The tip end portion 12j has a rectangular tubular shape that opens radially outward. The terminal holding portion 12c holds a terminal 81 described later.

Figure 2:
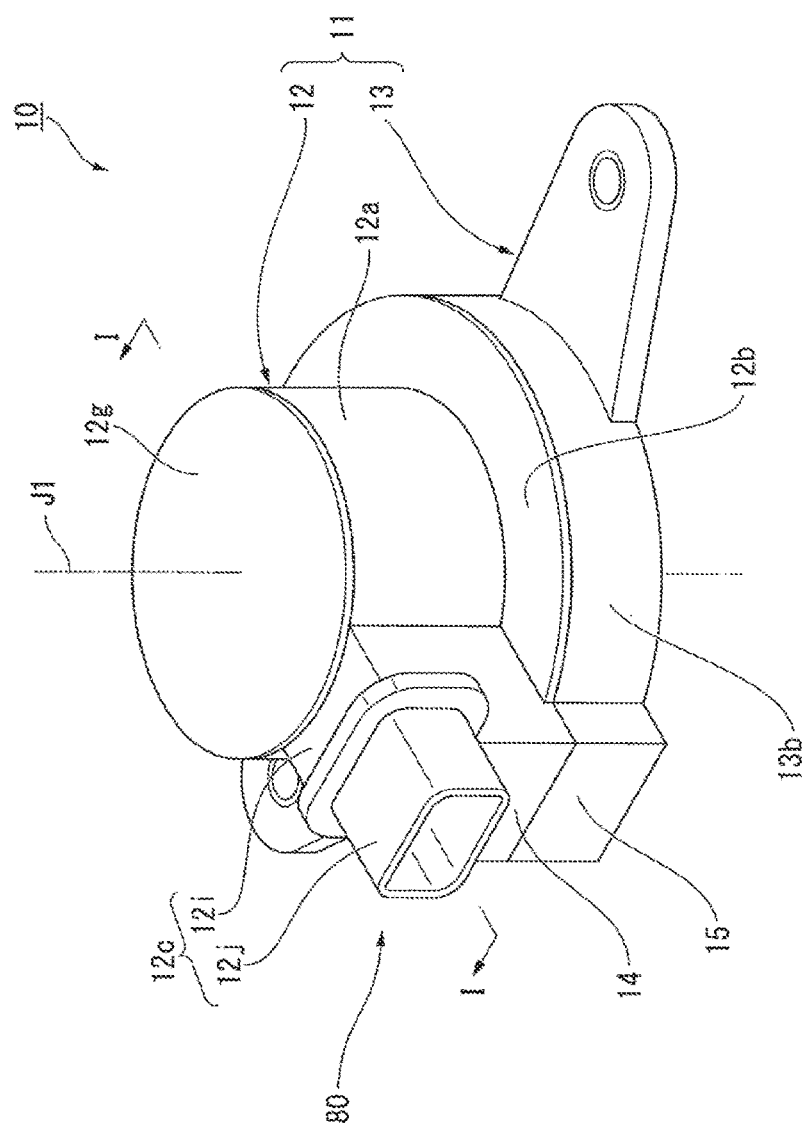
FIG. 2 is a perspective view illustrating the electric actuator of the present embodiment.

As illustrated in FIGS. 1 and 2, the first wiring holding portion 14 protrudes radially outward from the case tubular portion 12a. As illustrated in FIG. 2, the first wiring holding portion 14 is disposed below an inner portion in the radial direction of the base portion 12i. The first wiring holding portion 14 has a substantially rectangular parallelepiped shape. The upper end portion of the first wiring holding portion 14 is connected to the lower end portion of the base portion 12i. As illustrated in FIG. 1, the lower surface of the first wiring holding portion 14 is connected to the lower surface of the case flange portion 12b, and is disposed on the same plane orthogonal to the lower surface of the case flange portion 12b in the axial direction.

The first wiring holding portion 14 includes a first recessed portion 14a recessed from the lower side to the upper side. That is, the motor case 12 includes the first recessed portion 14a. Although not illustrated, an outer shape of the first recessed portion 14a viewed from below is, for example, a rectangular shape.

The speed reduction mechanism case 13 includes a lid portion 13a, a tubular portion 13b, a protruding tubular portion 13c, and a second wiring holding portion 15. The lid portion 13a has an annular plate shape with the first central axis J1 as a center. An outer end in the radial direction of the lid portion 13a is positioned radially outward from the case tubular portion 12a. The lid portion 13a covers the lower side of the speed reduction mechanism 30. The lid portion 13a has an accommodating recessed portion 13d recessed downward from the upper surface of the lid portion 13a. The accommodating recessed portion 13d has an annular shape extending in the circumferential direction.

The tubular portion 13b has a cylindrical shape protruding upward from an outer edge portion in the radial direction of the lid portion 13a. The tubular portion 13b has a second opening portion 13h opening upward. That is, the speed reduction mechanism case 13 has the second opening portion 13h. The upper end portion of the tubular portion 13b is in contact with and is fixed to the outer edge portion in the radial direction of the lower surface of the case flange portion 12b. The protruding tubular portion 13c has a cylindrical shape protruding downward from an inner edge portion in the radial direction of the lid portion 13a. The protruding tubular portion 13c opens downward.

An inside of the protruding tubular portion 13c includes a first large diameter portion 13e, a small diameter portion 13f, and a second large diameter portion 13g. The first large diameter portion 13e is an upper end portion inside the protruding tubular portion 13c, opens upward, and is connected to an inside of the tubular portion 13b. The small diameter portion 13f is connected to a lower end of the first large diameter portion 13e on the lower side of the first large diameter portion 13e. An inner diameter of the small diameter portion 13f is smaller than an inner diameter of the first large diameter portion 13e. The second large diameter portion 13g is connected to the lower end of the small diameter portion 13f on the lower side of the small diameter portion 13f. The second large diameter portion 13g is the lower end portion inside the protruding tubular portion 13c, opens downward, and is connected to the outside of the case 11. An inner diameter of the second large diameter portion 13g is larger than an inner diameter of the small diameter portion 13f. The inner diameter of the second large diameter portion 13g is, for example, the same as the inner diameter of the first large diameter portion 13e. The inner diameter of the second large diameter portion 13g may be smaller or larger than the inner diameter of the first large diameter portion 13e.

A cylindrical bush 54 extending in the axial direction is disposed inside the protruding tubular portion 13c. The bush 54 is fitted in the small diameter portion 13f and fixed to the protruding tubular portion 13c. The lower end of the bush 54 is located above the lower end of the small diameter portion 13f. The bush 54 includes a flange portion protruding radially outward to the upper end portion. The flange portion of the bush 54 comes in contact with a step between the first large diameter portion 13e and the small diameter portion 13f from the upper side. As a result, the bush 54 is prevented from falling out from the small diameter portion 13f to the lower side.

As illustrated in FIGS. 1 and 2, the second wiring holding portion 15 protrudes radially outward from the tubular portion 13b. As illustrated in FIG. 2, the second wiring holding portion 15 is disposed below the first wiring holding portion 14. The second wiring holding portion 15 is substantially rectangular parallelepiped. As illustrated in FIG. 1, the upper surface of the second wiring holding portion 15 is disposed at the same position in the axial direction as the upper end of the tubular portion 13b. The lower surface of the second wiring holding portion 15 is connected to the lower surface of the lid portion 13a and is disposed on the same plane orthogonal to the lower surface of the lid portion 13a in the axial direction.

The second wiring holding portion 15 includes a second recessed portion 15a recessed from the upper side to the lower side. That is, the speed reduction mechanism case 13 has the second recessed portion 15a. Although not illustrated, the outer shape of the second recessed portion 15a viewed from above is, for example, a rectangular shape. The second recessed portion 15a overlaps the first recessed portion 14a in the axial direction. The dimension in the axial direction of the second recessed portion 15a is smaller than the dimension in the axial direction of the first recessed portion 14a.

A lower end portion of the motor case 12 and an upper end portion of the speed reduction mechanism case 13 are fixed to each other in a state where the first opening portion 12h and the second opening portion 13h are opposed to each other in the axial direction. In the present embodiment, the lower end portion of the motor case 12 includes a lower end portion of the case flange portion 12b and a lower end portion of the first wiring holding portion 14. In the present embodiment, the upper end portion of the speed reduction mechanism case 13 includes an upper end portion of the tubular portion 13b and an upper end portion of the second wiring holding portion 15. In a state where the motor case 12 and the speed reduction mechanism case 13 are fixed to each other, the inside of the first opening portion 12h and the inside of the second opening portion 13h are connected to each other.

The motor 20 includes a motor shaft 21, a rotor 22, and a stator 23. The motor shaft 21 is rotatably supported around the first central axis J1 by the first bearing 51, the second bearing 52, and the third bearing 53. The motor shaft 21 includes a first shaft portion 21a, a second shaft portion 21b, and a third shaft portion 21c.

The first shaft portion 21a extends in the axial direction with the first central axis J1 as a center. The first shaft portion 21a includes a rotor fixing shaft portion 21d, an upper shaft portion 21e, and a lower shaft portion 21f. A rotor 22 is fixed to an outer peripheral surface of the rotor fixing shaft portion 21d. The upper shaft portion 21e is connected to the upper end of the rotor fixing shaft portion 21d on the upper side of the rotor fixing shaft portion 21d. The upper shaft portion 21e is the upper end portion of the first shaft portion 21a and is the upper end portion of the motor shaft 21. The outer diameter of the upper shaft portion 21e is smaller than the outer diameter of the rotor fixing shaft portion 21d. The upper shaft portion 21e is supported by the third bearing 53.

The lower shaft portion 21f is connected to the lower end of the rotor fixing shaft portion 21d on the lower side of the rotor fixing shaft portion 21d. The lower shaft portion 21f is a lower end portion of the first shaft portion 21a. The outer diameter of the lower shaft portion 21f is smaller than the outer diameter of the rotor fixing shaft portion 21d and larger than the outer diameter of the upper shaft portion 21e. The outer diameter of the lower shaft portion 21f is larger than the inner diameter of an inner ring of the second bearing 52. The lower shaft portion 21f is opposed to the inner ring of the second bearing 52 in the axial direction on the upper side of the inner ring of the second bearing 52.

The second shaft portion 21b extends on the lower side of the first shaft portion 21a with a second central axis J2 eccentric to the first central axis J1 as a center. The second central axis J2 is parallel to the first central axis J1. In FIG. 1, the second central axis J2 is eccentric to the left with respect to the first central axis J1. The second shaft portion 21b is connected to the lower end of the first shaft portion 21a. The outer diameter of the second shaft portion 21b is smaller than the outer diameter of the lower shaft portion 21f. The second shaft portion 21b is supported by the second bearing 52.

The third shaft portion 21c extends in the axial direction with the first central axis J1 as a center. The third shaft portion 21c is connected to the lower end of the second shaft portion 21b on the lower side of the second shaft portion 21b. The outer diameter of the third shaft portion 21c is smaller than the outer diameter of the second shaft portion 21b. The third shaft portion 21c is a lower end portion of the motor shaft 21. The third shaft portion 21c is supported by the first bearing 51.

The rotor 22 includes a cylindrical rotor core fixed to the outer peripheral surface of the rotor fixing shaft portion 21d and a magnet fixed to the outer peripheral surface of the rotor core. The stator 23 includes an annular stator core surrounding the outer side in the radial direction of the rotor 22 and a plurality of coils mounted on the stator core. The stator 23 is fixed to the inner peripheral surface of the case tubular portion 12a. As a result, the motor 20 is held in the motor case 12.

The control portion 24 includes a control board 70, a second attachment member 73, a second magnet 74, and a second rotation sensor 71. That is, the electric actuator 10 includes the control board 70, the second attachment member 73, the second magnet 74, and the second rotation sensor 71.

The control board 70 has a plate shape extending in a plane orthogonal to the axial direction. The control board 70 is accommodated in the motor case 12. More specifically, the control board 70 is accommodated in the control board accommodating portion 12f and fixed to the upper surface of the annular plate portion 12d. The control board 70 is a first board electrically connected to the motor 20. Although not illustrated, the coil of the stator 23 is electrically connected to the control board 70. The control board 70 controls, for example, the current supplied to the motor 20. That is, for example, an inverter circuit is mounted on the control board 70.

The second attachment member 73 has an annular shape with the first central axis J1 as a center. The inner peripheral surface of the second attachment member 73 is fixed to the outer peripheral surface of the portion of the rotor fixing shaft portion 21*d* above the rotor 22. The outer edge portion in the radial direction of the second attachment member 73 is disposed at a position protruding upward. The outer edge portion in the radial direction of the second attachment member 73 surrounds the outer side in the radial direction of the third bearing 53 and the bearing holding portion 12*e*. The second attachment member 73 is made of a nonmagnetic material, for example. The second attachment member 73 may be made of a magnetic material.

The second magnet 74 has an annular plate shape expanding in a plane orthogonal to the axial direction with the first central axis J1 as a center. The second magnet 74 is fixed to the upper end surface of the outer edge portion in the radial direction of the second attachment member 73. A method of fixing the second magnet 74 to the second attachment member 73 is not particularly limited, and the method of fixing is, for example, an adhesive or the like. The second attachment member 73 and the second magnet 74 rotate together with the motor shaft 21. The second magnet 74 surrounds the outer side in the radial direction of the third bearing 53 and the bearing holding portion 12*e* and is disposed at a position overlapping the third bearing 53 in the radial direction. The second magnet 74 has a north pole and a south pole disposed alternately along the circumferential direction.

The second rotation sensor 71 is a sensor that detects the rotation of the motor 20. The second rotation sensor 71 is attached to the lower surface of the control board 70. The second rotation sensor 71 is disposed inside the hole portion penetrating the annular plate portion 12*d* in the axial direction. The second rotation sensor 71 is opposed to the second magnet 74 in the axial direction via a gap. The second rotation sensor 71 detects a magnetic field generated by the second magnet 74. The second rotation sensor 71 is, for example, a Hall element. Although not illustrated, for example, a plurality of three second rotation sensors 71 are provided along the circumferential direction. By detecting the change in the magnetic field generated by the second magnet 74 rotating together with the motor shaft 21 using the second rotation sensor 71, the rotation of the motor shaft 21 can be detected.

The connector portion 80 is a portion to be connected to electrical wiring outside the case 11. The connector portion 80 is provided in the case 11. More specifically, the connector portion 80 is provided in the motor case 12. The connector portion 80 includes a terminal holding portion 12*c* and the terminal 81 described above. The terminal 81 is embedded and held in the base portion 12*i* of the terminal holding portion 12*c*. One end of the terminal 81 is fixed to the upper surface of the control board 70. The other end of the terminal 81 protrudes from the outer end portion in the radial direction of the base portion 12*i* to the inside of the tip end portion 12*j* and is exposed to the outside of the case 11. In this embodiment, the terminal 81 is, for example, a bus bar.

An external power supply is connected to the connector portion 80 via electrical wiring (not illustrated). More specifically, the external power supply is attached to the tip end portion 12*j*, and the electrical wiring of the external power supply is electrically connected to a portion of the terminal 81 protruding into the tip end portion 12*j*. As a result, the terminal 81 electrically connects the control board 70 and the electrical wiring to each other. Therefore, in the present embodiment, power is supplied from the external power source to the coil of the stator 23 via the terminal 81 and the control board 70.

The speed reduction mechanism 30 is disposed radially outward of the lower portion of the motor shaft 21. More specifically, the speed reduction mechanism 30 is disposed radially outward of the second shaft portion 21*b* and the third shaft portion 21*c*. The speed reduction mechanism 30 is accommodated inside the speed reduction mechanism case 13. The speed reduction mechanism 30 is disposed between the lid portion 13*a* and the case flange portion 12*b* in the axial direction. The speed reduction mechanism 30 includes an external gear 31, an internal gear 33, and a connecting portion 34.

Figure 3:
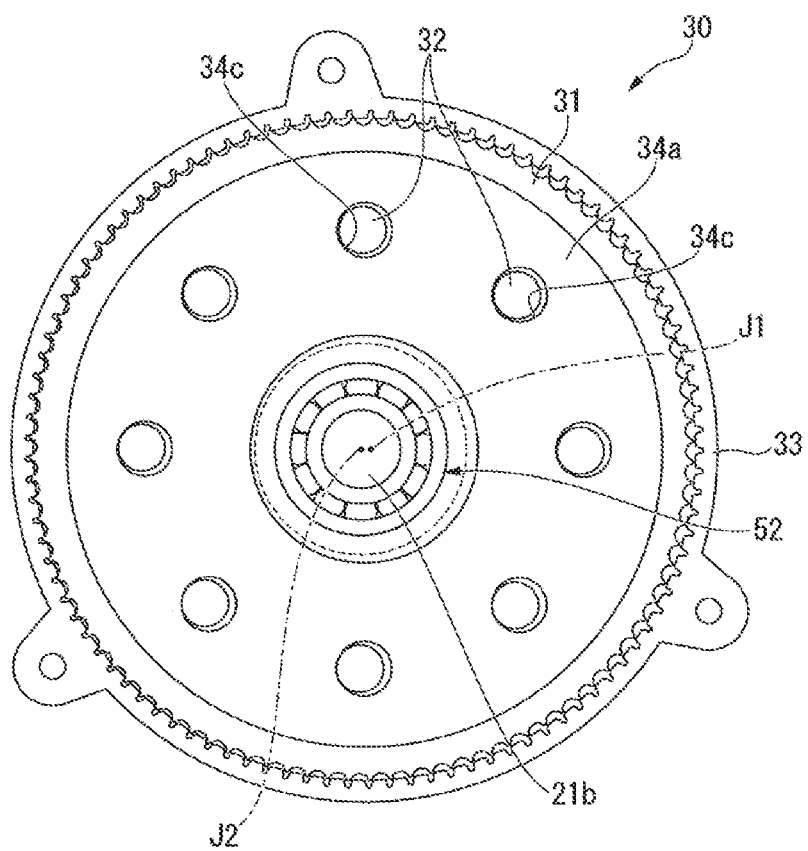
FIG. 3 is a view of a speed reduction mechanism of the present embodiment as viewed from below.

The external gear 31 has a substantially annular plate shape extending in a plane orthogonal to the axial direction with the second central axis J2 as a center. As illustrated in FIG. 3, a gear portion is provided on the outer surface in the radial direction of the external gear 31. As illustrated in FIGS. 1 and 3, the external gear 31 is connected to the second shaft portion 21*b* via the second bearing 52. That is, the second shaft portion 21*b* is connected to the speed reduction mechanism 30 via the second bearing 52, and the speed reduction mechanism 30 is connected to the motor shaft 21. The external gear 31 is fitted to an outer ring of the second bearing 52 from the outer side in the radial direction. As a result, the second bearing 52 couples the motor shaft 21 and the external gear 31 relatively rotatably around the second central axis J2. In FIG. 3, illustration of a cylindrical portion 34*b* described later is omitted.

The external gear 31 includes a plurality of pins 32. As illustrated in FIG. 1, the pin 32 has a cylindrical shape protruding downward. As illustrated in FIG. 3, the plurality of pins 32 are disposed at regular intervals along the circumferential direction with the second central axis J2 as a center. In FIG. 3, for example, eight pins 32 are provided.

The internal gear 33 is fixed while surrounding the outer side in the radial direction of the external gear 31 and meshes with the external gear 31. As illustrated in FIGS. 1 and 3, the internal gear 33 has an annular shape with the first central axis J1 as a center. As illustrated in FIG. 1, the outer edge portion in the radial direction of the internal gear 33 is disposed and fixed in a recessed portion which is provided on the inner peripheral surface of the tubular portion 13*b* and recessed radially outward. As a result, the speed reduction mechanism 30 is held in the speed reduction mechanism case 13. As illustrated in FIG. 3, a gear portion is provided on the inner peripheral surface of the internal gear 33. The gear portion of the internal gear 33 meshes with the gear portion of the external gear 31. More specifically, the gear portion of the internal gear 33 meshes partially with the gear portion of the external gear 31 (left side portion in FIG. 3).

As illustrated in FIG. 1, the connecting portion 34 is disposed on the lower side of the external gear 31. The connecting portion 34 includes an annular portion 34*a* and a cylindrical portion 34*b*. The annular portion 34*a* has an annular plate shape expanding in the radial direction with the first central axis J1 as a center. The annular portion 34*a* includes a plurality of holes 34*c* penetrating the annular portion 34*a* in the axial direction. That is, the connecting portion 34 includes a plurality of holes 34*c*.

As illustrated in FIG. 3, the plurality of holes 34*c* are disposed at equal intervals over one circumference along the circumferential direction. In FIG. 3, for example, eight holes 34c are provided. The shape viewed along the axial direction of the hole 34c is a circular shape. The inner diameter of the hole 34c is larger than the outer diameter of the pin 32. As illustrated in FIGS. 1 and 3, a plurality of pins 32 provided in the external gear 31 are respectively passed through a plurality of the holes 34c. The outer peripheral surface of the pin 32 is inscribed in the inner peripheral surface of the hole 34c. The inner peripheral surface of the hole 34c supports an external gear 31 so as to be able to swing around the first central axis J1 via the pin 32.

As illustrated in FIG. 1, the cylindrical portion 34b has a cylindrical shape extending downward from the inner edge of the annular portion 34a. The cylindrical portion 34b includes a cylindrical portion main body 34d that opens on both axial sides, and an annular plate-shaped annular bottom plate portion 34e that protrudes radially inward from the lower end portion of the cylindrical portion main body 34d and extends in the circumferential direction. A first bearing 51 is fixed to the inner peripheral surface at the upper end portion of the cylindrical portion main body 34d. The lower end portion of the cylindrical portion main body 34d and the annular bottom plate portion 34e are inserted into the first large diameter portion 13e. The lower surface of the annular bottom plate portion 34e is in contact with the upper surface of the flange portion of the bush 54. In the present embodiment, the connecting portion 34 is a single member.

The output portion 40 is a portion that outputs the driving force of the electric actuator 10. The output portion 40 includes the connecting portion 34 of the speed reduction mechanism 30 described above and an output shaft portion 41. As described above, the first bearing 51 supporting the motor shaft 21 is fixed to the inner peripheral surface at the upper end portion of the cylindrical portion main body 34d of the connecting portion 34. As a result, the first bearing 51 connects the motor shaft 21 and the output portion 40 so as to be rotatable relative to each other.

The output shaft portion 41 extends in the axial direction and is disposed on the lower side of the motor shaft 21. In the present embodiment, the output shaft portion 41 has a multistage cylindrical shape with the first central axis J1 as a center. The output shaft portion 41 includes a supported portion 41a, a flange portion 41b, and an attached portion 41c.

The supported portion 41a is inserted radially inward of the bush 54. The supported portion 41a is rotatably supported by the bush 54 around the first central axis J1. The lower end of the supported portion 41a is positioned within the second large diameter portion 13g. The flange portion 41b expands radially outward from the upper end portion of the supported portion 41a. The flange portion 41b is positioned radially inward of the cylindrical portion main body 34d. The lower surface of the flange portion 41b is in contact with the upper surface of the annular bottom plate portion 34e. The attached portion 41c is connected to the lower end of the supported portion 41a on the lower side of the supported portion 41a. The attached portion 41c protrudes downward from the protruding tubular portion 13c. Another member to which the driving force of the electric actuator 10 is output is attached to the attached portion 41c.

The output shaft portion 41 is fixedly connected to the connecting portion 34. More specifically, the output shaft portion 41 is fixed to the connecting portion 34, for example, by welding the supported portion 41a or the flange portion 41b to the annular bottom plate portion 34e. As a result, the output shaft portion 41 is connected to the lower end portion of the cylindrical portion 34b.

The output portion 40 has an output recessed portion 40a recessed from the upper side to the lower side. In the present embodiment, the output recessed portion 40a is configured to include the inner peripheral surface of the cylindrical portion main body 34d and the upper end surface of the output shaft portion 41. More specifically, an inner side surface in the radial direction of the output recessed portion 40a is the upper portion of the inner peripheral surface of the cylindrical portion main body 34d, and the lower bottom surface of the output recessed portion 40a is the upper end surface of the output shaft portion 41. That is, in the present embodiment, at least a portion of the inner side surface of the output recessed portion 40a is the inner side surface of the cylindrical portion 34b. As described above, in the present embodiment, since the output portion 40 is configured to include the connecting portion 34 and the output shaft portion 41 which are separate members from each other, the output recessed portion 40a can be easily provided and the output portion 40 can be easily formed.

As described above, since the first bearing 51 is fixed to the inner peripheral surface at the upper end portion of the cylindrical portion main body 34d, the first bearing 51 is fixed to the inner side surface in the radial direction of the output recessed portion 40a. In addition, the third shaft portion 21c supported by the first bearing 51, that is, the lower end portion of the motor shaft 21 is accommodated in the output recessed portion 40a.

Between the bottom surface of the lower side of the output recessed portion 40a, that is, the upper end surface of the output shaft portion 41 in the present embodiment and the lower end surface of the motor shaft 21, that is, the lower end surface of the third shaft portion 21c in the present embodiment, a gap DP is provided.

When the motor shaft 21 is rotated around the first central axis J1, the second shaft portion 21b (second central axis J2) revolves in the circumferential direction with the first central axis J1 as a center. The revolution of the second shaft portion 21b is transmitted to the external gear 31 via the second bearing 52, and the external gear 31 swings while the position where the inner peripheral surface of the hole 34c and the outer peripheral surface of the pin 32 are inscribed changes. As a result, the position where the gear portion of the external gear 31 and the gear portion of the internal gear 33 mesh with each other changes in the circumferential direction. Therefore, the rotational force of the motor shaft 21 is transmitted to the internal gear 33 via the external gear 31.

Here, in the present embodiment, since the internal gear 33 is fixed, the internal gear 33 does not rotate. Therefore, the external gear 31 rotates around the second central axis J2 by the reaction force of the rotational force transmitted to the internal gear 33. At this time, the direction where the external gear 31 rotates is opposite to the direction where the motor shaft 21 rotates. The rotation of the external gear 31 around the second central axis J2 is transmitted to the connecting portion 34 via the hole 34c and the pin 32. As a result, the connecting portion 34 rotates around the first central axis J1, and the output portion 40 rotates around the first central axis J1. In this manner, the rotation of the motor shaft 21 is transmitted to the output portion 40 via the speed reduction mechanism 30.

The rotation of the output portion 40 is decelerated with respect to the rotation of the motor shaft 21 by the speed reduction mechanism 30. Specifically, in the configuration of the speed reduction mechanism 30 of the present embodiment, a reduction ratio R of the rotation of the output portion 40 with respect to the rotation of the motor shaft 21 is represented by R=−(N2−N1)/N2. A minus sign at a head of the formula representing the reduction ratio R indicates that the direction of rotation of the output portion 40 to be decelerated is opposite to the direction where the motor shaft 21 rotates. N1 is the number of teeth of the external gear 31 and N2 is the number of teeth of the internal gear 33. As an example, in a case where the number of teeth N1 of the external gear 31 is 59 and the number of teeth N2 of the internal gear 33 is 60, the reduction ratio R is −1/60.

As described above, according to the speed reduction mechanism 30 of the present embodiment, the reduction ratio R of the rotation of the output portion 40 with respect to the rotation of the motor shaft 21 can be relatively increased. Therefore, a rotational torque of the output portion 40 can be made relatively large.

The rotation detection device 60 detects the rotation of the output portion 40. At least a portion of the rotation detection device 60 is disposed at a position overlapping the output recessed portion 40a in the radial direction. The output recessed portion 40a in which the first bearing 51 to which the output portion 40 and the motor shaft 21 are connected is inevitably provided in a case where the output shaft portion 41 is disposed on one side in the axial direction of the motor shaft 21 and is connected in the axial direction thereto as in the electric actuator 10 of the present embodiment. Therefore, at least a portion of the rotation detection device 60 is disposed so as to overlap the output recessed portion 40a in the radial direction, so that even when the rotation detection device 60 detecting the rotation of the output portion 40 is provided, it is possible to prevent the electric actuator 10 from increasing in size in the axial direction. As a result, the rotation detection device 60 can accurately detect the rotation of the output portion 40, and the electric actuator 10 having a structure capable of suppressing an increase in size can be obtained.

The rotation detection device 60 is accommodated in the speed reduction mechanism case 13. The rotation detection device 60 includes a circuit board 61, a first attachment member 64, a first magnet 63, and a first rotation sensor 62. A first rotation sensor 62 is attached to the circuit board 61. The circuit board 61 has a plate shape extending in a plane orthogonal to the axial direction. In the present embodiment, the circuit board 61 has an annular plate shape surrounding the outer side in the radial direction of the cylindrical portion main body 34d. At least a portion of the circuit board 61 is disposed at a position overlapping the output recessed portion 40a in the radial direction. Therefore, even when the rotation detection device 60 has the circuit board 61 as in the present embodiment, it is possible to prevent the electric actuator 10 from increasing in size in the axial direction.

In addition, the circuit board 61 to which the first rotation sensor 62 is attached is provided, so that it is easy to dispose the first rotation sensor 62. In the present embodiment, substantially the entire circuit board 61 is disposed at a position overlapping the gap DP in the radial direction in the output recessed portion 40a. The lower surface of the circuit board 61 is disposed at a position overlapping the upper end portion of the output shaft portion 41, that is, the flange portion 41b in the radial direction.

The circuit board 61 is disposed in the accommodating recessed portion 13d. Therefore, for example, compared with a case where the circuit board 61 is disposed on the upper surface of the lid portion 13a without providing the accommodating recessed portion 13d, the electric actuator 10 can be prevented from increasing in size in the axial direction. Therefore, the size of the electric actuator 10 can be further reduced. The circuit board 61 is fixed to the bottom surface of the accommodating recessed portion 13d.

The first attachment member 64 has an annular shape with the first central axis J1 as a center. The first attachment member 64 is fixed to the output portion 40. More specifically, the first attachment member 64 is fixed to the connecting portion 34. The first attachment member 64 is fitted to the outer side in the radial direction of the cylindrical portion main body 34d. The upper surface of the first attachment member 64 is in contact with the lower surface of the annular portion 34a. A method of fixing the first attachment member 64 to the connecting portion 34 is not particularly limited, and the method of fixing is, for example, an adhesive or the like.

The outer edge portion in the radial direction of the first attachment member 64 is disposed at a position protruding downward. The outer edge portion in the radial direction of the first attachment member 64 is disposed below the lower surface of the annular portion 34a with a space therebetween. The upper surface of the outer edge portion in the radial direction of the first attachment member 64 is located below the pin 32. Therefore, for example, even when the pin 32 is disposed at a position radially inward of the position illustrated in FIG. 1, the pin 32 can be prevented from coming into contact with the first attachment member 64. The first attachment member 64 is made of, for example, a nonmagnetic material. In addition, the first attachment member 64 may be made of a magnetic material.

The first magnet 63 has an annular plate shape expanding in a plane orthogonal to the axial direction with the first central axis J1 as a center. The first magnet 63 is fixed to the lower end surface of the outer edge portion in the radial direction of the first attachment member 64. As a result, the first magnet 63 is fixed to the output portion 40 via the first attachment member 64. Therefore, compared with a case where the first magnet 63 is directly fixed to the output portion 40, the first magnet 63 is easily fixed to the output portion 40.

In addition, as described above, the outer edge portion in the radial direction of the first attachment member 64 is disposed away from the annular portion 34a to the lower side, so that it is easy to suppress the interference of the first magnet 63 with the pin 32. A method of fixing the first magnet 63 to the first attachment member 64 is not particularly limited, and the method of fixing is, for example, an adhesive or the like. The first attachment member 64 and the first magnet 63 rotate together with the output portion 40. The first magnet 63 has a north pole and a south pole disposed alternately along the circumferential direction.

In the present embodiment, the first attachment member 64 and the first magnet 63 surround the outer side in the radial direction of the output recessed portion 40a, and are all disposed at positions overlapping the output recessed portion 40a in the radial direction. More specifically, the first attachment member 64 and the first magnet 63 are disposed at a portion accommodated in the output recessed portion 40a of the motor shaft 21, that is, a position overlapping the third shaft portion 21c in the radial direction in the present embodiment. In addition, the first attachment member 64 and the first magnet 63 are disposed at positions overlapping the first bearing 51 in the radial direction. In the present embodiment, the first attachment member 64 and the first magnet 63 are all disposed at positions overlapping the portion accommodated in the output recessed portion 40a of the motor shaft 21 and the first bearing 51 in the radial direction.

In addition, at least a portion of the rotation detection device 60 is disposed at a position overlapping the first bearing 51 supporting the output portion 40 in the radial direction, so that the rotation detection device 60 can be disposed by utilizing the space in the axial direction necessary for supporting the output portion 40. Therefore, it is possible to prevent the output portion 40 from increasing in size in the axial direction.

Since the first magnet 63 has the annular shape surrounding the outer side in the radial direction of the first bearing 51, the circumferential position of the first magnet 63 can be likely to be accurately detected by the first rotation sensor 62. In addition, when fixing the first magnet 63 to the first attachment member 64 with an adhesive or the like, it is easy to increase the adhesion area, and the first magnet 63 can be firmly fixed.

The first rotation sensor 62 is attached to the upper surface of the circuit board 61. The first rotation sensor 62 faces the first magnet 63 in the axial direction via a gap. The first rotation sensor 62 detects a magnetic field generated by the first magnet 63. The first rotation sensor 62 is, for example, a Hall element. Although not illustrated, a plurality, for example, three of first rotation sensors 62 are provided along the circumferential direction. By detecting the change in the magnetic field generated by the first magnet 63 rotating together with the output portion 40 using the first rotation sensor 62, the rotation detection device 60 can detect the rotation of the output portion 40.

At least a portion of the first rotation sensor 62 is disposed at a position overlapping the output recessed portion 40a in the radial direction. For example, even when minimizing the configuration of the rotation detection device 60, a sensor such as the first rotation sensor 62 that detects rotation is an indispensable component. Therefore, at least a portion of the first rotation sensor 62 is disposed so as to overlap the output recessed portion 40a in the radial direction, so that the size of the electric actuator 10 can be easily reduced in the axial direction. In the present embodiment, the entire first rotation sensor 62 is disposed at a position overlapping the output recessed portion 40a in the radial direction.

In addition, in the present embodiment, at least a portion of the first rotation sensor 62 is disposed at a position overlapping the gap DP. That is, at least a portion of the rotation detection device 60 is disposed at a position overlapping the gap DP in the radial direction. In a case where the output shaft portion 41 is disposed on one side in the axial direction of the motor shaft 21 as the electric actuator 10 of the present embodiment, the gap DP is inevitably provided between the motor shaft 21 and the output shaft portion 41 in the axial direction. Therefore, at least a portion of the rotation detection device 60 is disposed so as to overlap the gap DP in the radial direction, so that even when the rotation detection device 60 is provided, it is easy to further suppress the increase in size of the electric actuator 10 in the axial direction.

In addition, in the present embodiment, since at least a portion of the first rotation sensor 62 and at least a portion of the circuit board 61 are disposed at positions overlapping the gap DP in the radial direction, it is easy to suppress the increase in size of the electric actuator 10 in the axial direction while it is easy to dispose the first rotation sensor 62 by providing the circuit board 61. In the present embodiment, the entire first rotation sensor 62 is disposed at a position overlapping the gap DP in the radial direction.

In the present embodiment, the first rotation sensor 62 is disposed in the accommodating recessed portion 13d. Therefore, the size of the electric actuator 10 can be easily reduced in the axial direction, as compared with the case where the first rotation sensor 62 is disposed so as to protrude above the accommodating recessed portion 13d.

The first wiring member 91 and the second wiring member 92 are electrically connected to the rotation detection device 60. In the present embodiment, the first wiring member 91 and the second wiring member 92 are wiring members for connecting the circuit board 61 of the rotation detection device 60 and the control board 70 of the control portion 24. The first wiring member 91 includes a first bus bar 91a. In the present embodiment, the first wiring member 91 is configured to include the first bus bar 91a.

The first bus bar 91a is an elongated and plate-like member. In the present embodiment, the plate surface of the first bus bar 91a is parallel to both the axial direction and the radial direction where the terminal holding portion 12c extends. The first bus bar 91a includes a board connecting portion 91b, a first extending portion 91c, a second extending portion 91d, and a first connecting portion 93. That is, the first wiring member 91 includes the board connecting portion 91b, the first extending portion 91c, the second extending portion 91d, and the first connecting portion 93.

The board connecting portion 91b is a portion connected to the control board 70. The board connecting portion 91b extends in the axial direction. The lower portion of the board connecting portion 91b is embedded in the terminal holding portion 12c. The upper end portion of the board connecting portion 91b protrudes into the control board accommodating portion 12f. The upper end portion of the board connecting portion 91b passes through the control board 70 in the axial direction and is connected to the control board 70. As a result, the first wiring member 91 is electrically connected to the control board 70. The upper end portion of the board connecting portion 91b is connected to the control board 70 radially inward of the terminal 81. The first wiring member 91 is at least indirectly electrically connected to the electrical wiring outside the case 11 via the connector portion 80.

In the present specification, the fact that "first wiring member is at least indirectly electrically connected to the electrical wiring outside the case via the connector portion" is not particularly limited as long as the first wiring member is electrically connected to the electrical wiring connected to the connector portion. In the present embodiment, the first wiring member 91 is electrically connected to the control board 70 to which the terminal 81 of the connector portion 80 is electrically connected, thereby indirectly electrically connecting to the electrical wiring via the connector portion 80. The first wiring member 91 may be directly electrically connected to the electrical wiring outside the case 11 via the connector portion 80. In this case, the first wiring member 91 is not electrically connected to the control board 70 but is connected to the terminal 81 of the connector portion 80, or a portion of the first wiring member 91 is held in the terminal holding portion 12c as a terminal.

The first extending portion 91c extends radially outward from the lower end of the board connecting portion 91b. The entire first extending portion 91c is embedded in the terminal holding portion 12c. The second extending portion 91d extends downward from the outer end in the radial direction of the first extending portion 91c. The upper portion of the second extending portion 91d is embedded in the first wiring holding portion 14. The lower portion of the second extending portion 91d protrudes downward from the bottom surface of the first recessed portion 14a. The second extending portion 91d is disposed at a position overlapping the terminal holding portion 12c in the axial direction. That is, at least a portion of the first wiring member 91 is disposed at a position overlapping the connector portion 80 in the axial direction.

The first connecting portion 93 is provided at the lower end portion of the second extending portion 91d. That is, the second extending portion 91d is connected to the first connecting portion 93. In the present embodiment, the first connecting portion 93 is an end portion of the first bus bar 91a on the side opposite to the side connected to the control board 70. The first connecting portion 93 protrudes from the bottom surface of the inner side surface of the first recessed portion 14a into the first recessed portion 14a. The first connecting portion 93 is located at the lower opening of the first recessed portion 14a. The first connecting portion 93 is exposed on the lower side of the motor case 12.

In the present specification, the fact that "first connecting portion is exposed on the lower side of the motor case" includes that at least a portion of the first connecting portion is visible, when the motor case in a state where the first connecting portion is held and separated from the speed reduction mechanism case is viewed below.

Figure 4:
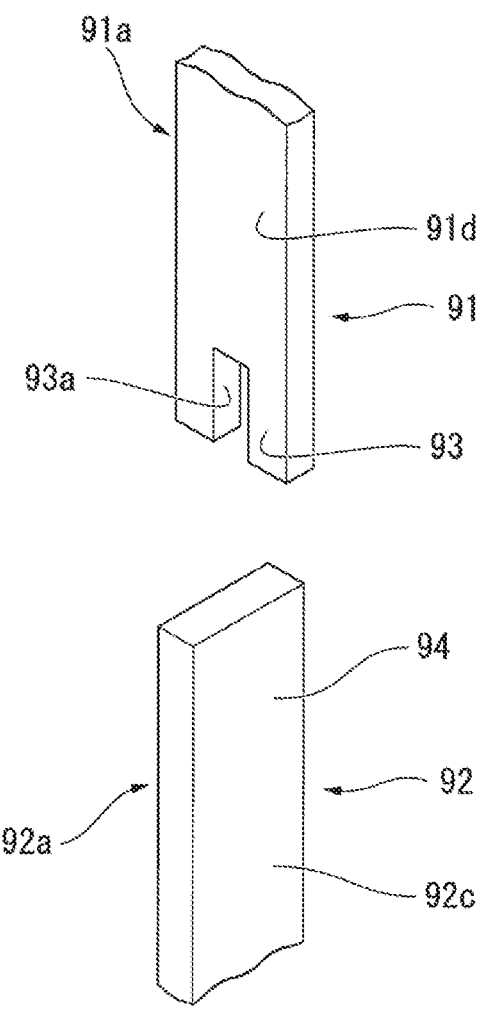
FIG. 4 is a perspective view illustrating a portion of the first wiring member and a portion of the second wiring member according to the present embodiment.

As illustrated in FIG. 4, the first connecting portion 93 includes a slit 93a which opens downward. The tip end of the first connecting portion 93 is divided into two branches by the slit 93a. A portion of the first bus bar 91a is embedded and held in the motor case 12, so that the first connecting portion 93 is held in the motor case 12.

As illustrated in FIG. 1, the second wiring member 92 includes a second bus bar 92a. In the present embodiment, the second wiring member 92 is configured to include the second bus bar 92a. The second bus bar 92a is an elongated and plate-like member. In the present embodiment, the plate surface of the second bus bar 92a is orthogonal to the plate surface of the first bus bar 91a. The second bus bar 92a includes a board connecting portion 92b, an extending portion 92c, and a second connecting portion 94. That is, the second wiring member 92 includes the board connecting portion 92b, the extending portion 92c, and the second connecting portion 94.

The board connecting portion 92b is a portion connected to the circuit board 61. The board connecting portion 92b extends in the radial direction. The outer portion in the radial direction of the board connecting portion 92b is embedded in the lid portion 13a and the second wiring holding portion 15. The inner end portion in the radial direction of the board connecting portion 92b protrudes into the accommodating recessed portion 13d from the inner side surface in the radial direction of the accommodating recessed portion 13d. The inner end portion in the radial direction of the board connecting portion 92b is connected to the outer edge portion in the radial direction on the upper surface of the circuit board 61.

The extending portion 92c extends upward from the outer end portion in the radial direction of the board connecting portion 92b. The lower portion of the extending portion 92c is embedded in the second wiring holding portion 15. The upper portion of the extending portion 92c protrudes upward from the bottom surface of the second recessed portion 15a. The extending portion 92c is disposed at a position overlapping the terminal holding portion 12c in the axial direction. That is, at least a portion of the second wiring member 92 is disposed at a position overlapping the connector portion 80 in the axial direction.

The second connecting portion 94 is provided at the upper end portion of the extending portion 92c. That is, the extending portion 92c is connected to the second connecting portion 94. In the present embodiment, the second connecting portion 94 is an end portion of the second bus bar 92a on the side opposite to the side connected to the circuit board 61. The second connecting portion 94 protrudes from the bottom surface of the inner side surface of the second recessed portion 15a into the second recessed portion 15a. The second connecting portion 94 is disposed so as to protrude upward from the opening on the upper side of the second recessed portion 15a. The second connecting portion 94 is exposed on the upper side of the speed reduction mechanism case 13.

In the present specification, the fact that "second connecting portion is exposed on the upper side of the speed reduction mechanism case" includes that at least a portion of the second connecting portion is visible, when the speed reduction mechanism case in a state where the second connecting portion is held and separated from the motor case is viewed above.

A portion of the second bus bar 92a is embedded and held in the speed reduction mechanism case 13, so that the second connecting portion 94 is held in the speed reduction mechanism case 13. The first connecting portion 93 and the second connecting portion 94 are disposed at positions overlapping in the axial direction in a state where the motor case 12 and the speed reduction mechanism case 13 are fixed, and are electrically connected to each other. As a result, the second bus bar 92a is electrically connected to the first bus bar 91a, and the first wiring member 91 and the second wiring member 92 are electrically connected to each other.

Figure 5:
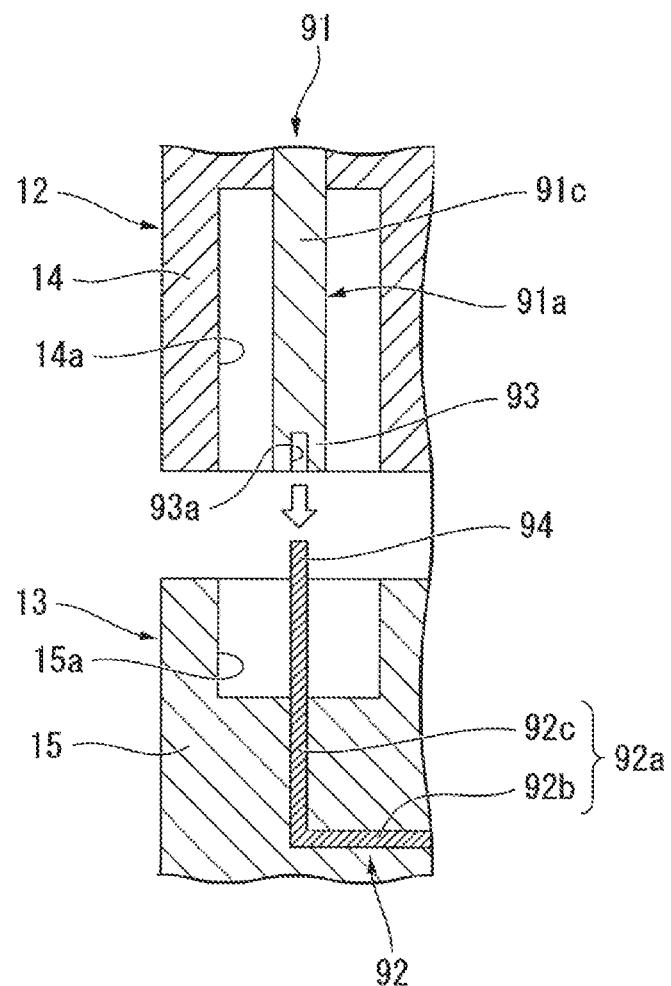
FIG. 5 is a cross-sectional view illustrating a portion of a procedure of assembling the electric actuator of the present embodiment.

According to the present embodiment, as illustrated in FIG. 5, the motor case 12 and the speed reduction mechanism case 13 are fixed close to each other in the axial direction, so that the first connecting portion 93 exposed on the lower side of the motor case 12 and the second connecting portion 94 exposed on the upper side of the speed reduction mechanism case 13 can be connected to each other. As a result, since the first wiring member 91 can be electrically connected to the second wiring member 92, the work of separately connecting the wiring members is unnecessary, and the first wiring member 91 held in the motor case 12 can be easily electrically connected to the rotation detection device 60.

Therefore, for example, in a case where the first wiring member 91 is electrically connected to the control board 70 as in this embodiment, the rotation detection device 60 can be electrically connected to the control board 70 via the first wiring member 91 and the second wiring member 92 only by fixing the motor case 12 and the speed reduction mechanism case 13 to each other. As described above, according to the present embodiment, it is possible to reduce the labor and the manufacturing cost of assembling the electric actuator 10.

In addition, according to the present embodiment, a power supply of the rotation detection device 60 can be obtained from a power supply of the motor 20 connected to the control board 70 and an external power source connected to the electric actuator 10 can be made one. Therefore, the configuration of the electric actuator 10 can be simplified. Specifically, in a case of the present embodiment, the power supply of the rotation detection device 60 is obtained from the external power source connected to the control board 70 via the connector portion 80, so that the external power source connected to the electric actuator 10 can be made one.

In addition, in the present embodiment, at least a portion of the rotation detection device 60 is disposed in a position overlapping in the radial direction in the output recessed portion 40a where the first bearing 51 connecting the motor shaft 21 and the output portion 40 is disposed. Therefore, for example, as compared with the case where the rotation detection device 60 overlaps the lower portion of the output shaft portion 41 in the radial direction, the rotation detection device 60 can be disposed close to the motor 20. Therefore, it is possible to shorten the first wiring member 91 and the second wiring member 92 connecting the rotation detection device 60 and the control board 70.

In addition, in the present embodiment, at least a portion of the rotation detection device 60 is disposed at a position accommodated in the output recessed portion 40a of the motor shaft 21 or at a position overlapping the first bearing 51 in the radial direction. Therefore, the rotation detection device 60 can be disposed closer to the motor 20, and it is possible to further shorten the first wiring member 91 and the second wiring member 92 connecting the rotation detection device 60 and the control board 70 to each other.

In addition, according to the present embodiment, since each wiring member has a bus bar, it is easy to make the rigidity of each wiring member relatively large. As a result, it is possible to stably hold each wiring member for each case. In addition, by using a portion of the bus bars as connecting portions, the positions of each connecting portion are easily stabilized when fixing each case to each other, and it is easy to connect each connecting portion to each other. In addition, for example, each wiring member can be inserted into a metal mold and each case can be manufactured by insert molding, so that the manufacture of each case can be facilitated.

In the present embodiment, the second connecting portion 94 is inserted into the slit 93a, and the first connecting portion 93 and the second connecting portion 94 are connected to each other. According to the embodiment, since the first connecting portion 93 can be manufactured only by providing the slit 93a at the end portion of the first bus bar 91a, it is easy to manufacture the first connecting portion 93.

In addition, according to the present embodiment, since the first connecting portion 93 protrudes into the first recessed portion 14a, the position can be finely adjusted within the range of the first recessed portion 14a. Therefore, even in a case where the relative position where the first connecting portion 93 and the second connecting portion 94 are held is shifted, by fine adjustment of the position of the first connecting portion 93, it is likely to connect the first connecting portion 93 and the second connecting portion 94 to each other.

In addition, according to the present embodiment, since the second connecting portion 94 protrudes into the second recessed portion 15a, the position can be finely adjusted within the range of the second recessed portion 15a. Therefore, even in a case where the relative position where the first connecting portion 93 and the second connecting portion 94 are held is shifted, by fine adjustment of the position of the second connecting portion 94, it is likely to connect the first connecting portion 93 and the second connecting portion 94 to each other.

In addition, according to the present embodiment, since the control board 70 as the first board and the second rotation sensor 71 attached to the control board 70 are provided, the rotation speed of the motor 20 can be detected by the second rotation sensor 71. In addition, since the control board 70 as the first board is accommodated in the motor case 12, for example, by providing the connector portion 80 in the motor case 12 as in the present embodiment, it is easy to electrically connect both the control board 70 and the first wiring member 91 to the external power supply via the connector portion 80.

In addition, since the first board accommodated in the motor case 12 is the control board 70 that controls the current supplied to the motor 20, the control portion 24 of the motor 20 can be accommodated in the case 11 and can be formed integrally with the electric actuator 10.

In addition, according to the present embodiment, at least a portion of the first wiring member 91 is disposed at a position overlapping the connector portion 80 in the axial direction so that the circumferential position of the first wiring holding portion 14 can be aligned with the circumferential position of the connector portion 80. As a result, the portion protruding outward in the radial direction from the case tubular portion 12a can be collectively disposed at the same circumferential position, and the size of the portion of the motor case 12 other than the portion where the connector portion 80 and the first wiring holding portion 14 are provided can be reduced in the radial direction.

In addition, according to the present embodiment, since the second extending portion 91d connected to the first connecting portion 93 is disposed at a position overlapping the terminal holding portion 12c, that is, the connector portion 80 in the axial direction, it is easy to dispose the first connecting portion 93 at a position overlapping the terminal holding portion 12c in the axial direction. As a result, it is easy to dispose the second connecting portion 94 connected to the first connecting portion 93 at a position overlapping the connector portion 80 in the axial direction. Accordingly, the circumferential position of the second wiring holding portion 15 on which the second wiring member 92 is held can be aligned with the circumferential position of the connector portion 80. Therefore, it is possible to collectively dispose the second wiring holding portion 15 protruding radially outward from the tubular portion 13b at the same position in the circumferential direction as the portion protruding radially outward from the case tubular portion 12a. As a result, the size of the portion of the case 11 other than the portion where the connector portion 80, the first wiring holding portion 14, and the second wiring holding portion 15 are provided can be reduced in the radial direction.

In addition, according to the present embodiment, at least one of the first wiring member 91 and the second wiring member 92 is partially embedded and held in the case 11. Therefore, in a case where a portion of the first wiring member 91 is embedded and held in the motor case 12, by manufacturing the motor case 12 by insert molding in which the first wiring member 91 is inserted into the metal mold, the first wiring member 91 can be held easily and stably in the motor case 12. In addition, in a case where a portion of the second wiring member 92 is embedded and held in the speed reduction mechanism case 13, by manufacturing the speed reduction mechanism case 13 by insert molding in which the second wiring member 92 is inserted into the metal mold, the second wiring member 92 can be held easily and stably in the speed reduction mechanism case 13. In the present embodiment, both of the first wiring member 91 and the second wiring member 92 are partially embedded and held in the case 11. Therefore, by using the insert molding, each wiring member can be held easily and stably in each case.

In addition, according to the present embodiment, since the motor 20 is held in the motor case 12, it is likely to supply power from the external power source to the motor 20 by providing the connector portion 80 to which the external power source is connected in the motor case 12. In addition, according to the present embodiment, since the speed reduction mechanism 30 is held in the speed reduction mechanism case 13, the rotation detection device 60 accommodated in the speed reduction mechanism case 13 can easily detect the rotation of the output portion 40 to which the rotation of the motor shaft 21 is transmitted by the speed reduction mechanism 30.

Although not illustrated, a plurality of the first wiring members 91 and the second wiring members 92 are disposed side by side in a direction orthogonal to both the direction where the terminal holding portion 12c extends and the axial direction, for example. For example, three first wiring members 91 and three second wiring members 92 are provided.

The present invention is not limited to the above-described embodiment, and other configurations may be adopted. The first wiring member 91 may not be connected to the control board 70. In this case, for example, the end portion of the first wiring member 91 on the side opposite to the first connecting portion 93 may protrude into the inside of the tip end portion 12j and be exposed to the outside of the case 11. As a result, it is possible to directly connect the electrical wiring of the external power source connected to the connector portion 80 to the first wiring member 91.

In addition, the first wiring member 91 may not overlap the connector portion 80 in the axial direction. In addition, any one of a portion of the first wiring member 91 and a portion of the second wiring member 92 may not be embedded in the case 11, or both of these may not be embedded in the case 11. In addition, the first recessed portion 14a may not be provided. In this case, the first connecting portion 93 is exposed on the lower surface of the motor case 12 or protrudes downward from the lower surface of the motor case 12. In addition, the second recessed portion 15a may not be provided. In this case, the second connecting portion 94 is exposed on the upper surface of the speed reduction mechanism case 13 or protrudes upward from the upper surface of the speed reduction mechanism case 13.

In addition, at least one of the first connecting portion 93 and the second connecting portion 94 may be a joint member that connects the first bus bar 91a and the second bus bar 92a to each other. In the electric actuator 110 illustrated in FIG. 6, the first wiring member 191 includes a first bus bar 191a and a joint member 193 as a first connecting portion connected to an end portion of the first bus bar 191a. The joint member 193 is provided with a portion to which the second connecting portion 94 is connected so that the second connecting portion 94 can be stably and easily connected to the joint member 193. Therefore, the first bus bar 191a and the second bus bar 92a can be stably and easily connected to each other by the joint member 193.

Figure 6:
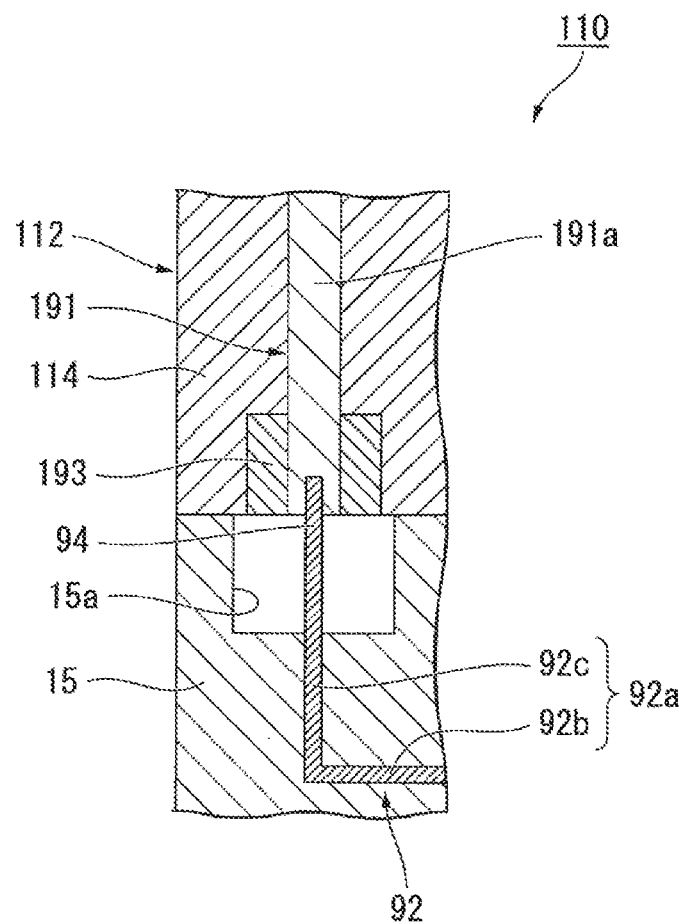
FIG. 6 is a cross-sectional view illustrating a portion of an electric actuator serving as another example of the present embodiment.

In the configuration of FIG. 6, the first wiring holding portion 114 does not include the first recessed portion. The joint member 193 is embedded and held in the first wiring holding portion 114. As a result, the joint member 193 is fixed to the case 11. Therefore, the position of the joint member 193 can be stabilized, and the second connecting portion 94 can be easily connected to the joint member 193. The lower surface of the joint member 193 is exposed on the lower surface of the first wiring holding portion 114. The lower surface of the joint member 193 is, for example, disposed on the same plane orthogonal to the lower surface of the first wiring holding portion 114 in the axial direction. The joint member 193 may not be directly fixed to the case 11 as long as the joint member 193 is fixed to the motor case 112 via the first bus bar 191a.

In the configuration of FIG. 6, the second connecting portion 94 may be a joint member connected to the joint member 193. In addition, only the second wiring member among the first wiring member and the second wiring member may have the joint member.

In addition, in the above embodiment, each wiring member is configured to include only each bus bar, but the invention is not limited thereto. As in the configuration of FIG. 6 described above, the wiring member may have the joint member connected to the bus bar, or may have another member connected to the bus bar. In addition, the first wiring member 91 may not have the first bus bar 91a, and the second wiring member 92 may not have the second bus bar 92a. For example, each wiring member may have a lead wire instead of a bus bar. In addition, even in a case where each wiring member does not have a bus bar, at least one of the wiring members may have a joint member that connects each wiring member to each other.

In addition, the control board 70 may not be provided. In this case, the terminal 81 is directly and electrically connected to the coil of the stator 23. In addition, the first board accommodated in the motor case 12 may not be the control board. In this case, the inverter circuit and the like are provided outside the electric actuator 10.

In addition, the connecting portion 34 and the output shaft portion 41 may be fixed in any manner unless these rotate relative to each other. For example, a configuration may be adopted in which relative rotation between the connecting portion 34 and the output shaft portion 41 is suppressed using a pin or the like, or a configuration may be adopted in which a hole D cut is provided in the connecting portion 34 and the output shaft portion 41 is inserted into the hole. In addition, the output portion 40 may be a single member, and each of the connecting portion 34 and the output shaft portion 41 may be a portion of one single member.

In addition, the configuration of the rotation detection device 60 is not particularly limited as long as the rotation detection device 60 can detect the rotation of the output portion 40 and be accommodated in the speed reduction mechanism case 13. For example, the circuit board 61 may not be provided. In addition, the first rotation sensor 62 is not particularly limited as long as the first rotation sensor 62 can detect the rotation of the output portion 40, and may be a magnetoresistive element. In addition, similarly, the second rotation sensor 71 may be a magnetoresistive element. In addition, the configuration of the speed reduction mechanism 30 is not particularly limited as long as the speed reduction mechanism 30 can decelerate the rotation of the motor shaft 21. In addition, the first bearing 51, the second bearing 52, and the third bearing 53 are not particularly limited as long as these can support the motor shaft 21, and these may be, for example, sliding bearings or the like.

In addition, the application of the electric actuator of the present invention is not limited, and the electric actuator of the present invention may be mounted on any equipment. In addition, each of the above-described configurations can be appropriately combined within a range not contradictory to each other.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric actuator comprising:
   a motor that has a motor shaft extending in an axial direction;
   a speed reduction mechanism disposed on an outer side in a radial direction of a portion on one side of the motor shaft in the axial direction and connected to the motor shaft;
   a case that accommodates the motor and the speed reduction mechanism;
   an output portion to which rotation of the motor shaft is transmitted via the speed reduction mechanism;
   a first board electrically connected to the motor;
   a rotation detection device that detects rotation of the output portion;
   a connector portion provided in the case and connected to electrical wiring outside the case;
   a first wiring member electrically connected at least indirectly to the electrical wiring via the connector portion; and
   a second wiring member electrically connected to the rotation detection device,
   wherein the case includes
   a first case provided with the connector portion and including a first opening portion which opens on the one side in the axial direction, and
   a second case including a second opening portion which opens on the other side in the axial direction,
   the first board is accommodated in the first case,
   the rotation detection device is accommodated in the second case,
   an end portion on the one side in the axial direction of the first case and an end portion on the other side in the axial direction of the second case are fixed to each other in a state where the first opening portion and the second opening portion are opposed to each other in the axial direction,
   the first wiring member includes a first connecting portion held in the first case,
   the second wiring member includes a second connecting portion held in the second case,
   the first connecting portion is exposed on the one side of the first case in the axial direction,
   the second connecting portion is exposed on the other side of the second case in the axial direction, and
   the first connecting portion and the second connecting portion are disposed at positions overlapping in the axial direction in a state where the first case and the second case are fixed to each other, and are electrically connected to each other.

2. The electric actuator according to claim 1,
   wherein the first wiring member includes a first bus bar, and
   the second wiring member includes a second bus bar electrically connected to the first bus bar.

3. The electric actuator according to claim 2,
   wherein at least one of the first connecting portion and the second connecting portion is a joint member that connects the first bus bar and the second bus bar to each other.

4. The electric actuator according to claim 3,
   wherein the joint member is fixed to the case.

5. The electric actuator according to claim 1,
   wherein the first case includes a first recessed portion recessed from the one side in the axial direction to the other side in the axial direction, and
   the first connecting portion protrudes into the first recessed portion from an inner side surface of the first recessed portion.

6. The electric actuator according to claim 5,
   wherein the second case includes a second recessed portion recessed from the other side in the axial direction to the one side in the axial direction, and
   the second connecting portion protrudes into the second recessed portion from an inner side surface of the second recessed portion.

7. The electric actuator according to claim 5, further comprising:
   a sensor attached to the first board and that detects the rotation of the motor.

8. The electric actuator according to claim 5,
   wherein the first board is a control board that controls a current to be supplied to the motor.

9. The electric actuator according to claim 5,
   wherein the first wiring member is electrically connected to the first board.

10. The electric actuator according to claim 1,
    wherein the first case includes a case tubular portion having a cylindrical shape and including the first opening portion,
    the connector portion includes a terminal that electrically connects the first board and the electrical wiring to each other, and protrudes radially outward from the case tubular portion, and
    at least a portion of the first wiring member is disposed at a position overlapping the connector portion in the axial direction.

11. The electric actuator according to claim 10,
    wherein the first wiring member includes
    a first extending portion that extends in the radial direction, and
    a second extending portion that extends from an outer end of the first extending portion in the radial direction to the one side in the axial direction and is connected to the first connecting portion, and
    the second extending portion is disposed at a position overlapping the connector portion in the axial direction.

12. The electric actuator according to claim 11,
    wherein at least one of the first wiring member and the second wiring member is partially embedded and held in the case.

13. The electric actuator according to claim 12,
    wherein the motor is held in the first case.

14. The electric actuator according to claim 13,
    wherein the speed reduction mechanism is held in the second case.

* * * * *